United States Patent [19]

Kadokura et al.

[11] Patent Number: 4,671,993
[45] Date of Patent: Jun. 9, 1987

[54] MAGNETIC RECORDING MEDIUM

[75] Inventors: Hidekimi Kadokura; Hiroshi Umezaki; Hideaki Murakami, all of Niihama, Japan

[73] Assignee: Sumitomo Chemical Company, Limited, Osaka, Japan

[21] Appl. No.: 789,506

[22] Filed: Oct. 21, 1985

[30] Foreign Application Priority Data

Oct. 25, 1984 [JP] Japan .................................. 59-224451

[51] Int. Cl.$^4$ ............................................. G11B 5/708
[52] U.S. Cl. ..................................... 428/323; 427/128; 428/328; 428/331; 428/694; 428/900; 428/329; 428/695; 428/405; 428/403; 428/407
[58] Field of Search ............... 428/694, 695, 900, 323, 428/329, 328, 331, 405, 407, 403; 427/128; 252/62.54; 360/134-136

[56] References Cited

U.S. PATENT DOCUMENTS

| | | | |
|---|---|---|---|
| 3,833,412 | 9/1974 | Akashi | 252/62.54 |
| 3,929,658 | 12/1975 | Beske | 427/128 |
| 4,420,531 | 12/1983 | Tokuda | 428/694 |
| 4,431,712 | 2/1984 | Matsufuji | 428/694 |
| 4,460,651 | 7/1984 | Hosaka | 428/694 |
| 4,578,314 | 3/1986 | Ohta | 428/694 |

Primary Examiner—Ellis P. Robinson
Attorney, Agent, or Firm—Stevens, Davis, Miller & Mosher

[57] ABSTRACT

A magnetic recording medium comprising a substrate and a magnetic layer formed on the substrate and comprising an inorganic powder having an average primary particle size of 0.35 μm or less, an angle of repose of 40° or more and a Mors hardness of 5 or more as a reinforcing material, and a magnetic powder, is excellent in wear resistance and durability of the magnetic layer and improves wear and injury of a magnetic head.

8 Claims, No Drawings

MAGNETIC RECORDING MEDIUM

BACKGROUND OF THE INVENTION

This invention relates to a magnetic recording medium excellent in wear resistance of a magnetic layer, durability, and surface smoothness, and improved in suppression of wear at a magnetic head.

Heretofore, magnetic recording media for audio, video and computer have employed a process for incorporating as a reinforcing material a non-magnetic powder having an average primary particle size of about 0.5 μm or more such as $Al_2O_3$, $Cr_2O_3$, SiC, etc. into a magnetic layer. The incorporation of the reinforcing material improves wear resistance and durability of the magnetic recording media, but on the other hand brings about various disadvantages in that there is a tendency to increase wear and injury of magnetic heads, and surface smoothness of the magentic layer is lowered and electromagnetic transforming properties are deteriorated. Particularly, since high density of magnetic recording is intended recently by thinning the magnetic layer using a metallic magnetic powder or fine magnetic powder, the addition of the non-magnetic powder as reinforcing material promotes disadvantages such as an increase of wear and injury of magnetic head, lowering in smoothness of the magnetic layer, and lowering in electro-magnetic transforming properties.

In order to improve such disadvantages, it is proposed to add a non-magnetic powder having a very fine particle size (generally 0.4 μm or less) as a reinforcing material, but such a non-magnetic powder having a very fine particle size hardly contributes to improve the wear resistance and durability of magnetic layer, and thus not satisfactory.

SUMMARY OF THE INVENTION

In order to improve such disadvantages, the present inventors have studied variously and found that even fine powders having an average particle size of about 0.4 μm or less which had been regarded as not so effective as a reinforcing material are effective for improving the wear resistance and durability of magnetic layer and the wear resistance and injury resistance of magnetic head as well as the smoothness of the tape surface and exhibiting excellent electromagnetic transforming properties when these powders have a special shape, that is, when these powders are inorganic powders having a large angle of repose; thus the present invention has been accomplished.

This invention provides a magnetic recording medium comprising a substrate and a magnetic layer formed on the substrate and comprising as a reinforcing material an inorganic powder having an average primary particle size of 0.35 μm or less, an angle of repose of 40° or more, and a Mors hardness of 5 or more, and a magnetic powder.

DESCRIPTION OF THE PREFERRED EMBODIMENTS

The magnetic layer is obtained by coating on a substrate surface a magnetic coating composition obtained by uniformly mixing an inorganic powder used as a reinforcing material, a magnetic powder, a binder, a solvent, and if necessary other additives.

As the reinforcing material, there is used an inorganic powder having an average primary particle size of 0.35 μm or less, preferably 0.1 to 0.3 μm, an angle of repose of 40° or more, preferably 42° to 50°, and a Mors hardness of 5 or more.

When the average particle size of the inorganic powder is larger than 0.35 μm, although the wear resistance and injury resistance of the magnetic head are enhanced, the surface smoothness of the tape is undesirably lowered and the electromagnetic transforming properties are undesirably lowered. On the other hand, an inorganic powder having a particle size of less than 0.1 μm is expensive and poor in reinforcing effect, so that a preferable particle size of inorganic powder is 0.1 to 0.3 μm.

The angle of repose of the inorganic powder is a very important factor and shows a shape index of inorganic powder. The angle of repose can be measured according to JIS H 1902-1977. When the angle of repose is smaller than 40°, the wear resistance and durability of the magnetic layer and reinforcing effect for the tape are undesirably lost. A preferable angle of repose is 42° to 50°. Reasons for lowering the wear resistance and durability of the magnetic layer when the angle of repose is smaller than 40° are not clear, but when the angle of repose becomes smaller, edges of inorganic powders become round, which results in probably lowering abrasion ability.

The inorganic powder should also have a Mors hardness of 5 or more. When the Mors hardness is less than 5, both the reinforcing effect on a magnetic recording medium and the improvement in wear resistance are no longer expected.

Examples of the inorganic powder are α-alumina, γ-alumina, chromium oxide, titanium oxide, zirconium oxide, iron oxide, silica, cerium oxide, tin oxide, silicon carbide, spinel, and the like.

The inorganic powder is preferably added in an amount of 0.1 to 15% by weight, more preferably 0.5 to 10% by weight, based on the weight of magnetic powder. When the amount of the inorganic powder is less than 0.1% by weight, the wear resistance and the durability of the magnetic layer are lowered, whereas when the amount of the inorganic powder is more than 15% by weight, the wear and injury of the magnetic head become undesirably great.

The inorganic powder can be used as it is. In order to disperse the inorganic powder uniformly in the magnetic layer, it is preferable to treat the surface of the inorganic powder with a dispersing agent such as a fatty acid, a higher fatty acid salt, a sulfate of a higher alcohol, an alkylaryl sulfate, a dialkyl succinate, a polyoxyethylene alkylsulfate ester, a polyoxyethylene ether, a phosphate ester of a higher fatty acid, a silane coupling agent, a titanium coupling agent, or the like.

As the magentic powder, there can be used conventional magnetic materials such as $\gamma$-$Fe_2O_3$, $Fe_3O_4$, Co containing $\gamma$-$Fe_2O_3$, Co containing $Fe_3O_4$, $CrO_2$, a metal powder, e.g., reduced iron powder, reduced Co powder, or Fe-Ni alloy powder, and the like. The particle size of the magnetic powder is not particularly limited, but is usually 0.05 to 5 μm. The use of the metal powder or very fine powder of iron oxide together with the reinforcing agent, that is, the inorganic powder is particularly preferable in this invention.

As the binder, there can be used a thermoplastic resin, a thermosetting resin, or a mixture thereof. Examples of the binder are epoxy resins, polyurethane resins, urea resins, polyamide resins, silicone resins, polyester resins, phenol resins, urea-formaldehyde resins, vinyl resins, cellulose derivatives, polymers or copolymers of acrylic acid or methacrylic acid, alkyd resins, etc. These resins can be used alone or as a mixture thereof.

As the solvent for preparing the magnetic coating composition, there can be used aliphatic or alicyclic hydrocarbons such as hexane, heptane, cyclohexane, etc., aromatic hydrocarbons such as benzene, toluene, xylenes, etc., ketones such as methyl ethyl ketone, methyl isobutyl ketone, cyclohexanone, etc. These solvents can be used alone or as a mixture thereof.

The magnetic coating composition comprising an inorganic powder, a magnetic powder, a binder and a solvent can be coated on the surface of a substrate by a conventional method.

As the substrate, there can be used conventionally used tapes such as made from a polyester, floppy disc substrates, conventionally used disc substrates such as made from aluminum, etc.

The magnetic recording medium of this invention can be used as audio tapes, video tapes, magnetic tapes for computers, hard discs for computers, floppy discs, and the like.

This invention is illustrated by way of the following Examples, in which all parts are by weight unless otherwise specified.

EXAMPLE 1

A magnetic coating composition was prepared by mixing the following ingredients wherein $\alpha$-Al$_2$O$_3$ has an angle of repose of 47° measured according to JIS H1902-1977, an average primary particle size of 0.25 $\mu$m and a Mors hardness of 9:

| | |
|---|---|
| Fe—alloy magnetic powder (0.2 $\mu$m) | 100 parts |
| Polyurethan resin | 12 parts |
| (No. 5033 mfd. by Nippon Polyurethane Co.) | |
| Epoxy resin (No. 1004) | 5 parts |
| (mfd. by Shell Chemical Co.) | |
| Pyroxylin | 5 parts |
| $\alpha$-Al$_2$O$_3$ (av. particle size 0.25 $\mu$m, angle of repose 47°) | 3 parts |
| Methyl ethyl ketone | 70 parts |
| Methyl isobutyl ketone | 70 parts |
| Toluene | 70 parts |

The above-mentioned magnetic coating composition was ball milled for 48 hours for mixing and dispersion treatment, followed by coating on a polyester base film of 15 $\mu$m thick so as to give the film thickness of 5 $\mu$m after dried. After dried, the resulting tape was cut with a predetermined width to give a magnetic tape.

EXAMPLE 2

A magnetic tape was prepared in the same manner as described in Example 1 except for using $\alpha$-Al$_2$O$_3$ having an average primary particle size of 0.2 $\mu$m and an angle of repose of 44°.

EXAMPLE 3

A magnetic tape was prepared in the same manner as described in Example 1 except for using $\alpha$-Al$_2$O$_3$ having an average primary particle size of 0.30 $\mu$m and an angle of repose of 45°.

COMPARATIVE EXAMPLE 1

A magnetic tape was prepared in the same manner as described in Example 1 except for using $\alpha$-Al$_2$O$_3$ having an average primary particle size of 0.5 $\mu$m and an angle of repose of 46°.

COMPARATIVE EXAMPLE 2

A magnetic tape was prepared in the same manner as described in Example 1 except for using $\alpha$-Al$_2$O$_3$ having an average primary particle size of 0.25 $\mu$m and an angle of repose of 38°.

The magnetic tapes thus obtained in Examples and Comparative Examples were placed in a video tape recorder and run for 30 hours. Then the abrasion amount of a magnetic head of the video tape recorder (sendust) and still characteristics were measured.

The still characteristics were measured by running a magnetic tape on a video tape recorder to reproduce a still picture and determining the time (still life) elapsed before the output signal had declined by 10 dB from the input level.

The abrasion of the magnetic head was determined by repeated running test for 100 hours to reproduce recorded signals.

The surface roughness of a magnetic tape was also measured by using a surface roughness meter and evaluated as an average roughness along the center line.

The results are shown in Table 1.

TABLE 1

| Example No. | Still characteristics (min.) | Abrasion of head ($\mu$m/100 hrs.) | Average roughness along center line ($\mu$m) |
|---|---|---|---|
| Example 1 | $\geq$90 | 2 | 0.02 |
| Example 2 | $\geq$90 | 1 | 0.02 |
| Example 3 | 60 | 2 | 0.04 |
| Comparative Example 1 | 30 | 5 | 0.08 |
| Comparative Example 2 | 15 | 1 | 0.02 |

As is clear from the above results, the use of special inorganic powder as a reinforcing material makes the wear resistance and durability of the magnetic layer excellent and the wear and injury suppression effect of the magnetic head improved as well as the surface roughness of the magnetic layer improved.

What is claimed is:

1. A magnetic recording medium comprising a substrate and a magnetic layer formed on the substrate and comprising an inorganic powder having an average primary particle size of 0.35 $\mu$m or less, an angle of repose of 40° or more and a Mors hardness of 5 or more as a reinforcing material and a magnetic powder wherein the inorganic powder is contained in an amount of 0.1 to 15% by weight based on the weight of the magnetic powder.

2. A magnetic recording medium according to claim 1, wherein the angle of repose of the inorganic powder is 42° to 50°.

3. A magnetic recording medium according to claim 1, wherein the average primary particle size of the inorganic powder is 0.1 to 0.3 $\mu$m.

4. A magnetic recording medium according to claim 1, wherein the inorganic powder is contained in an amount of 0.1 to 15% by weight based on the weight of the magnetic powder.

5. A magnetic recording medium according to claim 1, wherein the inorganic powder is $\alpha$-alumina, $\gamma$-alumina, chromium oxide, titanium oxide, zirconium oxide, iron oxide, silica, cerium oxide, tin oxide, silicon carbide, spinel or a mixture thereof.

6. A magnetic recording medium according to claim 1, wherein the inorganic powder is treated with a dispersing agent.

7. A magnetic recording medium according to claim 6, wherein the dispersing agent is a fatty acid, a higher fatty acid salt, a sulfate of a higher alcohol, an alkylaryl sulfate, a dialkyl succinate, a polyoxyethylene alkylsulfate ester, a polyoxyethylene ether, a phosphate ester of a higher fatty acid, a silane coupling agent or a titanium coupling agent.

8. A magnetic recording medium produced by coating a magnetic coating composition comprising a magnetic powder, an inorganic powder having an average primary particle size of 0.35 μm or less, an angle of repose of 40° or more and a Mors hardness of 5 or more as a reinforcing material, a binder and a solvent, on a substrate, drying the magnetic coating composition to form a magnetic layer.

* * * * *